United States Patent
Bonnet et al.

(10) Patent No.: US 11,932,916 B2
(45) Date of Patent: *Mar. 19, 2024

(54) METHOD OF DYNAMICAL ADJUSTMENT FOR MANUFACTURING A THERMALLY TREATED STEEL SHEET

(71) Applicant: ArcelorMittal, Luxembourg (LU)

(72) Inventors: Frédéric Bonnet, Avril (FR); Van Thang Pham, Metz (FR)

(73) Assignee: ArcelorMittal, Luxembourg (LU)

( * ) Notice: Subject to any disclaimer, the term of this patent is extended or adjusted under 35 U.S.C. 154(b) by 1182 days.

This patent is subject to a terminal disclaimer.

(21) Appl. No.: 16/466,742

(22) PCT Filed: Dec. 20, 2017

(86) PCT No.: PCT/IB2017/058187
§ 371 (c)(1),
(2) Date: Jun. 5, 2019

(87) PCT Pub. No.: WO2018/116192
PCT Pub. Date: Jun. 28, 2018

(65) Prior Publication Data
US 2019/0352738 A1    Nov. 21, 2019

(30) Foreign Application Priority Data

Dec. 20, 2016  (WO) ................. PCT/IB2016/001788

(51) Int. Cl.
*C21D 11/00*   (2006.01)
*B22D 11/20*   (2006.01)
*C21D 9/573*   (2006.01)
*G06F 30/17*   (2020.01)
*G06F 119/08*  (2020.01)

(52) U.S. Cl.
CPC ........... *C21D 11/005* (2013.01); *B22D 11/202* (2013.01); *C21D 9/573* (2013.01); *G06F 30/17* (2020.01); *G06F 2119/08* (2020.01)

(58) Field of Classification Search
CPC ..... B22D 11/202; C21D 11/00; C21D 11/005; C21D 9/573; G06F 2119/08; G06F 30/17
See application file for complete search history.

(56) References Cited

U.S. PATENT DOCUMENTS

| 4,440,583 A | 4/1984 | Ikegami et al. |
| 5,891,275 A | 4/1999 | Elfmark et al. |
| 2014/0175713 A1 | 6/2014 | Roessiger |

FOREIGN PATENT DOCUMENTS

| CN | 102851474 A | 1/2013 |
| EP | 0033600 A2 | 8/1981 |
| EP | 0453566 A1 | 10/1991 |
| JP | S62156228 A | 7/1987 |
| JP | 2000160290 A | 6/2000 |

(Continued)

OTHER PUBLICATIONS

The International Search Report issued in connection with International application No. PCT/IB2017/058187 dated Mar. 26, 2018.

(Continued)

*Primary Examiner* — Jenny R Wu
(74) *Attorney, Agent, or Firm* — Davidson, Davidson & Kappel, LLC

(57) ABSTRACT

The present invention provides a method of dynamical adjustment for manufacturing a thermally treated steel sheet.

37 Claims, 4 Drawing Sheets

(56) References Cited

FOREIGN PATENT DOCUMENTS

| JP | 5693392 B2 | 4/2015 |
|---|---|---|
| RU | 2518039 C2 | 6/2014 |
| WO | WO2010049600 A1 | 5/2010 |
| WO | 2016016683 A1 | 2/2016 |

OTHER PUBLICATIONS

The International Preliminary Report issued in connection with International application No. PCT/IB2017/058187 dated Mar. 4, 2019.

METHOD OF DYNAMICAL ADJUSTMENT FOR MANUFACTURING A THERMALLY TREATED STEEL SHEET

FIELD OF THE INVENTION

The present invention relates to a method of dynamical adjustment for manufacturing a thermally treated steel sheet having a chemical steel composition and a microstructure $m_{target}$ comprising from 0 to 100% of at least one phase chosen among: ferrite, martensite, bainite, pearlite, cementite and austenite, in a heat treatment line.

BACKGROUND

It is known to use coated or bare steel sheets for the manufacture of automotive vehicles. A multitude of steel grades are used to manufacture a vehicle. The choice of steel grade depends on the final application of the steel part. For example, IF (Interstitial-Free) steels can be produced for an exposed part, TRIP (Transformation-Induced Plasticity) steels can be produced for seat and floor cross members or A-pillars and DP (Dual Phase) steels can be produced for rear rails or roof cross member.

During the production of theses steels, crucial treatments are performed on the steel in order to obtain the desired part having excepted mechanical properties for one specific application. Such treatments can be, for example, a continuous annealing before deposition of a metallic coating or a quenching and partitioning treatment. In these treatments, the cooling step is important because the microstructure and the mechanical properties of steels mostly depend on the performed cooling treatment. Usually, the treatment including the cooling step to perform is selected in a list of known treatments, this treatment being chosen depending on the steel grade.

However, during these treatments, some unplanned deviations can appear online. For example, a temperature in the furnace, the thickness of the steel sheet, the line speed can vary.

U.S. Pat. No. 4,440,583 relates to a method of controlled cooling for steel strip implemented by use of a cooling apparatus comprising a plurality of nozzles disposed in the direction in which strip travels, the nozzles spraying coolant against the hot running strip, and a flow-rate control valve attached to the pipe that supplies the coolant to the nozzles. By using an equation containing the thickness of strip, the cooling starting and finishing temperatures, and the desired cooling rate, the heat transfer rate needed to obtain the desired cooling rate is calculated, and the obtained heat transfer rate is corrected according to the effect of natural cooling in idle-pass zones preceding and following the coolant spray zone. Then, the flow rate of the coolant is derived, and set, from its pre-established relationship with the heat transfer rate. The length of the coolant spraying zone along the strip travel path is calculated using the running speed of the strip, the cooling starting and finishing temperatures, and the desired cooling rate. The nozzles are set to turn on and off so that coolant is sprayed from only such a number of nozzles as correspond to the calculated value. When strip thickness varies while controlled cooling is being effected, the heat transfer rate is re-calculated, on the basis of the above settings, to correct the coolant flow rate accordingly. When strip speed varies, the length of the coolant spraying region is re-calculated to correct the on-off pattern of the nozzles.

In this method, when a deviation appears, the heat transfer rate or the length of the coolant spraying region is re-calculated to correct the deviation. This method does not take into account the steel sheet characteristics comprising chemical composition, microstructure, properties, surface texture, etc. Thus, there is a risk that the same correction is applied to any kind of steel sheet even if each steel sheet has its own characteristics. The method allows for a non-personalized cooling treatment of a multitude of steel grades.

Consequently, the correction is not adapted to one specific steel and therefore at the end of the treatment, the desired properties are not obtained. Moreover, after the treatment, the steel can have a big dispersion of the mechanical properties. Finally, even if a wide range of steel grades can be manufactured, the quality of the treated steel is poor.

SUMMARY OF THE INVENTION

An object of various embodiments of the present invention is to solve the above drawbacks by providing a method of dynamical adjustment for manufacturing a thermally treated steel sheet having a specific chemical steel composition and a specific microstructure $m_{target}$ to reach in a heat treatment line.

An additional object of various embodiments of the present invention is to adjust a cooling treatment online by providing a treatment adapted to each steel sheet, such treatment being calculated very precisely in the lowest calculation time possible in order to to provide a steel sheet having the excepted properties, such properties having the minimum of properties dispersion possible.

The present invention provides a method of dynamical adjustment for manufacturing a thermally treated steel sheet having a chemical steel composition and a microstructure $m_{target}$ comp rising from 0 to 100% of at least one phase chosen among: ferrite, martensite, bainite, pearlite, cementite and austenite, in a heat treatment line comprising a heating section, a soaking section and a cooling section including a cooling system, wherein a predefined thermal treatment TT, comprising at least a heating, a soaking and a cooling steps, is performed, such method comprising:

A. a control step wherein at least one detector detects any deviation happening during TT, B. a calculation step performed when a deviation is detected during TT such that a new thermal path $TP_{target}$ is determined to reach $m_{target}$ taking the deviation into account, such calculation step comprising:

1) a calculation sub-step wherein through variation of the cooling power, new cooling paths $CP_x$ are calculated based on TT, the initial microstructure mi of the steel sheet to reach $m_{target}$, the heating path, the soaking path comprising $T_{soaking}$ and $T_{cooling}$, the cooling step of TT being recalculated using said $CP_x$ in order to obtain new thermal paths $TP_x$, having the cooling step replaced by one $CP_x$ in order to obtain a thermal path $TP_x$, each $TP_x$ corresponding to a microstructure $m_x$, 2) a selection step wherein one $TP_{target}$ to reach $m_{target}$ is selected, $TP_{target}$ being chosen among the calculated thermal paths $TP_x$ and being selected such that $m_x$ is the closest to $m_{target}$ and C. a new thermal treatment step wherein $TP_{target}$ is performed online on the steel sheet.

In some embodiments of the present invention, in step A), the deviation is due to a variation of one process parameter chosen from among: a furnace temperature, a steel sheet temperature, an amount of gas, a gas composition, a gas temperature, a line speed, a failure in the heat treatment line, a variation of the hot-dip bath, a steel sheet emissivity and a variation of the steel thickness.

In some embodiments of the present invention, the phases are defined by at least one element chosen from: the size, the shape and the chemical composition.

In some embodiments of the present invention, the microstructure $m_{target}$ comprises:
100% of austenite,
from 5 to 95% of martensite, from 4 to 65% of bainite, the balance being ferrite,
from 8 to 30% of residual austenite, from 0.6 to 1.5% of carbon in solid solution, the balance being ferrite, martensite, bainite, pearlite and/or cementite,
from 1% to 30% of ferrite and from 1% to 30% of bainite, from 5 and 25% of austenite, the balance being martensite,
from 5 to 20% of residual austenite, the balance being martensite,
ferrite and residual austenite,
residual austenite and intermetallic phases,
from 80 to 100% of martensite and from 0 to 20% of residual austenite
100% martensite,
from 5 to 100% of pearlite and from 0 to 95% of ferrite and
at least 75% of equiaxed ferrite, from 5 to 20% of martensite and bainite in amount less than or equal to 10%.

In some embodiments of the present invention, the steel sheet can be Dual Phase, Transformation Induced Plasticity, Quenched & Partitioned steel, Twins Induced Plasticity, Carbide Free Bainite, Press Hardening Steel, TRIPLEX, DUPLEX and Dual Phase High Ductility.

In some embodiments of the present invention, TT further comprises a pre-heating step.

In some embodiments of the present invention, TT further comprises a hot-dip coating step, an overaging step or a partitioning step.

In some embodiments of the present invention, in step B.1), the cooling power of the cooling system varies from a minimum to a maximum value.

In some embodiments of the present invention, in step B.1), the cooling power of the cooling system varies from a maximum to a minimum value.

In some embodiments of the present invention, in step B.1), $T_{soaking}$ is a fixed number selected from the range between 600 to 1000° C.

In some embodiments of the present invention, in step B.1), $T_{soaking}$ varies from 600 to 1000° C.

In some embodiments of the present invention, after step B.1), a further calculation sub step is performed wherein:
a. $T_{soaking}$ varies from in a predefined range value being between 600 and 1000° C. and
b. For each $T_{soaking}$ variation, new cooling paths CPx are calculated, based on TT, $m_i$ to reach $m_{standard}$ and $T_{cooling}$, the cooling step of TT being recalculated using said $CP_x$ in order to obtain new thermal paths $TP_x$, each $TP_x$ corresponding to a microstructure $m_x$.

In some embodiments of the present invention, in the selection step B.2), the selected $TP_{target}$ further includes the value of $T_{soaking}$.

In some embodiments of the present invention, in step B.2), when at least two $CP_x$ have their $m_x$ equal, the selected $TP_{target}$ selected is the one having the minimum cooling power needed.

In some embodiments of the present invention, in step B.1), the differences between phases proportions present in $m_{target}$ and $m_x$ is ±3%.

In some embodiments of the present invention, in step B.1), the thermal enthalpy H released between $m_i$ and $m_{target}$ is calculated such that:

$$H_{released} = (X_{ferrite} * H_{ferrite}) + (X_{martensite} * H_{martensite}) + (X_{bainite} * H_{bainite}) + (X_{pearlite} * H_{pearlite}) + (H_{cementite} + X_{cementite}) + (H_{austenite} + X_{austenite})$$

X being a phase fraction.

In some embodiments of the present invention, in step B.1), the all cooling path CPx is calculated such that:

$$T(t + \Delta t) = T(t) + \frac{(\varphi_{Convection} + \varphi_{radiance})}{\rho \cdot Ep \cdot C_{pe}} \Delta t \pm \frac{H_{released}}{C_{pe}}$$

with Cpe: the specific heat of the phase ($J \cdot kg^{-1} \cdot K^{-1}$), $\rho$: the density of the steel ($g \cdot m^{-3}$), Ep: thickness of the steel (m), $\varphi$: the heat flux (convective and radiative in W), $H_{released}$ ($J \cdot kg^{-1}$), T: temperature (° C.) and t: time (s).

In some embodiments of the present invention, in step B.1), at least one intermediate steel microstructure $m_{xint}$ corresponding to an intermediate cooling path $CP_{xint}$ and the thermal enthalpy $H_{xint}$ are calculated.

In some embodiments of the present invention, in step B.1), $CP_x$ is the sum of all $CP_{xint}$ and $H_{released}$ is the sum of all $H_{xint}$.

In some embodiments of the present invention, before step A.1.a), at least one targeted mechanical property $P_{target}$ chosen among yield strength YS, Ultimate Tensile Strength UTS, elongation hole expansion, formability is selected.

In some embodiments of the present invention, $m_{target}$ is calculated based on $P_{target}$.

In some embodiments of the present invention, in step B.1), the process parameters undergone by the steel sheet before entering the heat treatment line are taken into account to calculate $CP_x$.

In some embodiments of the present invention, the process parameters comprise at least one element chosen from among: a cold rolling reduction rate, a coiling temperature, a run out table cooling path, a cooling temperature and a coil cooling rate.

In some embodiments of the present invention, in step B.1) the process parameters of the treatment line that the steel sheet will undergo in the heat treatment line are taken into account to calculate $CP_x$.

In some embodiments of the present invention, the process parameters comprise at least one element chosen from among: a specific thermal steel sheet temperature to reach, the line speed, cooling power of the cooling sections, heating power of the heating sections, an overaging temperature, a cooling temperature, a heating temperature and a soaking temperature.

In some embodiments of the present invention, the cooling system comprises at least one jet cooling, at least one cooling spray or at least both.

In some embodiments of the present invention, the cooling system comprises at least one jet cooling, the jet cooling spraying a gas, an aqueous liquid or a mixture thereof.

In some embodiments of the present invention, the gas is chosen from air, $HN_x$, H2, $N_2$, Ar, He, steam water or a mixture thereof.

In some embodiments of the present invention, the aqueous liquid is chosen from water or nanofluid.

In some embodiments of the present invention, the jet cooling sprays air with a debit flow between 0 and 350000 Nm³/h.

In some embodiments of the present invention, $T_{cooling}$ is the bath temperature when the cooling section is followed by a hot-dip coating section comprising a hot-dip bath.

In some embodiments of the present invention, the bath is based on aluminum or a bath based on zinc.

In some embodiments of the present invention, $T_{cooling}$ is the quenching temperature Tq.

In some embodiments of the present invention, $T_{cooling}$ is between 150 and 800° C.

In some embodiments of the present invention, every time a new steel sheet enters into the heat treatment line, a new calculation step B.1) is automatically performed.

In some embodiments of the present invention, an adaptation of the cooling path is performed as the steel sheet entries into the cooling section of the heat treatment line on the first meters of the sheet.

In some embodiments of the present invention, an automatic calculation is performed during the thermal treatment to check if any deviation had appeared.

The present invention further provides a coil made of a steel sheet, including said predefined product types including DP, TRIP, Q&P, TWIP, CFB, PHS, TRIPLEX, DUPLEX and DP HD, obtainable from the methods of the present invention having a standard variation of mechanical properties below or equal to 25 MPa between any two points along the coil.

In some embodiments of the present invention, the coil has a standard variation of below or equal to 15 MPa between any two points along the coil.

In some embodiments of the present invention, the coil has a standard variation of below or equal to 9 MPa between any two points along the coil.

In some embodiments of the present invention, the coil is covered by a metallic coating based on zinc or based on aluminum.

The present invention further provides a thermally treatment line for the implementation of the methods of the present invention.

The present invention further provides a computer program product comprising at least a metallurgical module, an optimization module and a thermal module cooperating together to calculate $TP_{target}$ such modules comprising software instructions that when implemented by a computer implement the method according to the methods of the present invention.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figures.

DETAILED DESCRIPTION

Figure 1:
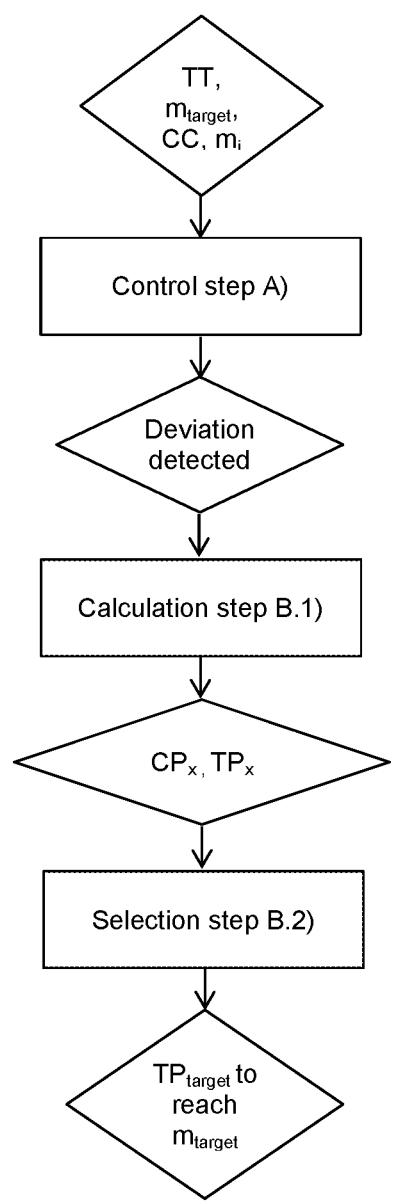
FIG. 1 illustrates an embodiment of the present invention.

The following terms will be defined:
CC: chemical composition in percentage in weight percent,
$m_{target}$: targeted value of the microstructure,
$m_{standard}$: the microstructure of the selected product,
$P_{target}$: targeted value of a mechanical property,
$m_i$: initial microstructure of the steel sheet,
X: phase fraction in weight percent,
T: temperature in degree Celsius (° C.),
t: time (s),
s: seconds,
UTS: ultimate tensile strength (MPa)
YS: yield stress (MPa)
metallic coating based on zinc means a metallic coating comprising above 50% of zinc,
metallic coating based on aluminum means a metallic coating comprising above 50% of aluminum and
TT: thermal treatment and
thermal path, TT, $TP_{target}$ and $TP_x$ comprises a time, a temperature of the thermal treatment and at least one rate chosen from: a cooling, an isotherm or a heating rate,
a heating path comprises a time, a temperature and a heating rate,
a soaking path comprises a time, a temperature and a soaking rate,
$CP_x$ and $CP_{xint}$ comprise a time, a temperature and a cooling rate and
nanofluids: fluid comprising nanoparticles.

The designation "steel" or "steel sheet" means a steel sheet, a coil, a plate having a composition allowing the part to achieve a tensile strength up to 2500 MPa and more preferably up to 2000 MPa. For example, the tensile strength is above or equal to 500 MPa, preferably above or equal to 1000 MPa, advantageously above or equal to 1500 MPa. A wide range of chemical composition is included since the method according to the invention can be applied to any kind of steel.

The invention provides a method of dynamical adjustment for manufacturing a thermally treated steel sheet having a chemical steel composition and a microstructure $m_{target}$ comprising from 0 to 100% of at least one phase chosen among: ferrite, martensite, bainite, pearlite, cementite and austenite, in a heat treatment line comprising a heating section, a soaking section and a cooling section including a cooling system, wherein a predefined thermal treatment TT, comprising at least a heating, a soaking and a cooling steps, is performed, such method comprising:

A. a control step wherein at least one detector detects any deviation happening during TT, B. a calculation step performed when a deviation is detected during TT such that a new thermal path $TP_{target}$ is determined to reach $m_{target}$ taking the deviation into account, such calculation step comprising:

1) a calculation sub-step wherein through variation of the cooling power, new cooling paths $CP_x$ are calculated based on TT, the initial microstructure $m_i$ of the steel sheet to reach $m_{target}$, the heating path, the soaking path comprising $T_{soaking}$ and $T_{cooling}$, the cooling step of TT being recalculated using said $CP_x$ in order to obtain new thermal paths $TP_x$, each $TP_x$ corresponding to a microstructure $m_x$, 2) a selection step wherein one $TP_{target}$ to reach $m_{target}$ is selected, $TP_{target}$ being chosen among the calculated thermal paths $TP_x$ and being selected such that $m_x$ is the closest to $m_{target}$ and C. a new thermal treatment step wherein $TP_{target}$ is performed online on the steel sheet.

Without willing to be bound by any theory, it appears that when a method according to the present invention is applied, it is possible to correct any deviation happening during a thermal treatment by providing a personalized heat treatment comprising a personalized cooling path which depends on each steel sheet. Thus, a precise new thermal path $TP_{target}$ is calculated in a short calculation time taking into account $m_{target}$, in particular the proportion of all the phases during the cooling path, $m_i$ (including the microstructure dispersion along the steel sheet) and the deviation. Indeed, the method according to an embodiment of the present invention takes into account for the calculation the thermodynamically stable phases, i.e. ferrite, austenite, cementite and pearlite, and the thermodynamic metastable phases, i.e. bainite and martensite. Thus, a steel sheet having the expected properties with the minimum of properties dispersion possible is obtained.

In some embodiments of the present invention, the microstructures $m_x$, $m_{target}$ and $m_i$ phases are defined by at least one element chosen from: the size, the shape and the chemical composition.

In some embodiments of the present invention, TT further comprises a pre-heating step. More preferably, TT further comprises a hot-dip coating step, an overaging step or a partitioning step.

In some embodiments of the present invention, the microstructure $m_{target}$ to reach comprises:
100% of austenite,
from 5 to 95% of martensite, from 4 to 65% of bainite, the balance being ferrite,
from 8 to 30% of residual austenite, from 0.6 to 1.5% of carbon in solid solution, the balance being ferrite, martensite, bainite, pearlite and/or cementite,
from 1% to 30% of ferrite and from 1% to 30% of bainite, from 5 and 25% of austenite, the balance being martensite,
from 5 to 20% of residual austenite, the balance being martensite,
ferrite and residual austenite,
residual austenite and intermetallic phases,
from 80 to 100% of martensite and from 0 to 20% of residual austenite
100% martensite,
from 5 to 100% of pearlite and from 0 to 95% of ferrite and
at least 75% of equiaxed ferrite, from 5 to 20% of martensite and bainite in amount less than or equal to 10%.

Advantageously, the steel sheets can be any kind of steel grade including Dual Phase DP, Transformation Induced Plasticity (TRIP), Quenched & Partitioned steel (Q&P), Twins Induced Plasticity (TWIP), Carbide Free Bainite (CFB), Press Hardening Steel (PHS), TRIPLEX, DUPLEX and Dual Phase High Ductility (DP HD).

The chemical composition depends on each steel sheet. For example, the chemical composition of a DP steel can comprise:
0.05<C<0.3%,
0.5≤Mn<3.0%,
S≤0.008%,
P≤0.080%,
N≤0.1%,
Si≤1.0%, the remainder of the composition making up of iron and inevitable impurities resulting from the development.

FIG. 1 illustrates an example according to the invention wherein a TT is performed on a steel sheet in a heat treatment line, such steel sheet having a chemical composition CC and $m_{target}$ to reach.

According to an embodiment of the present invention in step A), any deviation happening during the thermal treatment is detected. Preferably, the deviation is due to a variation of a process parameter chosen from among: a furnace temperature, a steel sheet temperature, an amount of gas, a gas composition, a gas temperature, a line speed, a failure in the heat treatment line, a variation of the hot-dip bath, a steel sheet emissivity and a variation of the steel thickness.

A furnace temperature can be a heating temperature, a soaking temperature, a cooling temperature, an overaging temperature.

A steel sheet temperature can be measured at any time of the heat treatment in different positions of the heat treatment line, for example:
in a heating section preferably being a direct flame furnace (DFF), a radian tube furnace (RTF), an electrical resistance furnace or an induction furnace,
in cooling section, in particular, in jets cooling, in a quenching system or in a snout and
in isothermal section preferably being an electrical resistance furnace.

To detect a temperature variation, the detector can be a pyrometer or a scanner.

Usually, heat treatments can be performed in an oxidizing atmosphere, i.e. an atmosphere comprising an oxidizing gas being for example: $O_2$, $CO_2$ or CO. They also can be performed in a neutral atmosphere, i.e. an atmosphere comprising a neutral gas being for example: $N_2$, Ar, He or Xe. Finally, they also can be performed in a reducing atmosphere, i.e. an atmosphere comprising a reducing gas being for example: $H_2$ or $HN_x$.

The variation of gas amount can be detected by barometer.

The line speed can be detected by a laser detector.

For example, a failure in the heat treatment line can be:
in a direct flame furnace: a burner not working anymore,
in a radiant tube furnace: a radiant tube not working anymore,
in an electrical furnace: a resistance not working anymore or
in a cooling section: one or several jets cooling not working anymore.

In such cases, detector can be a pyrometer, a barometer, an electrical consumption or a camera.

The variation of the steel thickness can be detected by a laser or an ultrasound detector.

When a deviation is detected, through variation of the cooling power, new cooling paths $CP_x$ are calculated based on TT, $m_i$ to reach $m_{target}$, the heating path, the soaking path comprising $T_{soaking}$ and $T_{cooling}$, the cooling step of TT being recalculated using said $CP_x$ in order to obtain new thermal paths $TP_x$, each $TP_x$ corresponding to a microstructure $m_x$. The calculation of $CP_x$ is based on the thermal behavior and metallurgical behavior of the steel sheet compared to the conventional methods wherein only the thermal behavior is considered.

Figure 2:
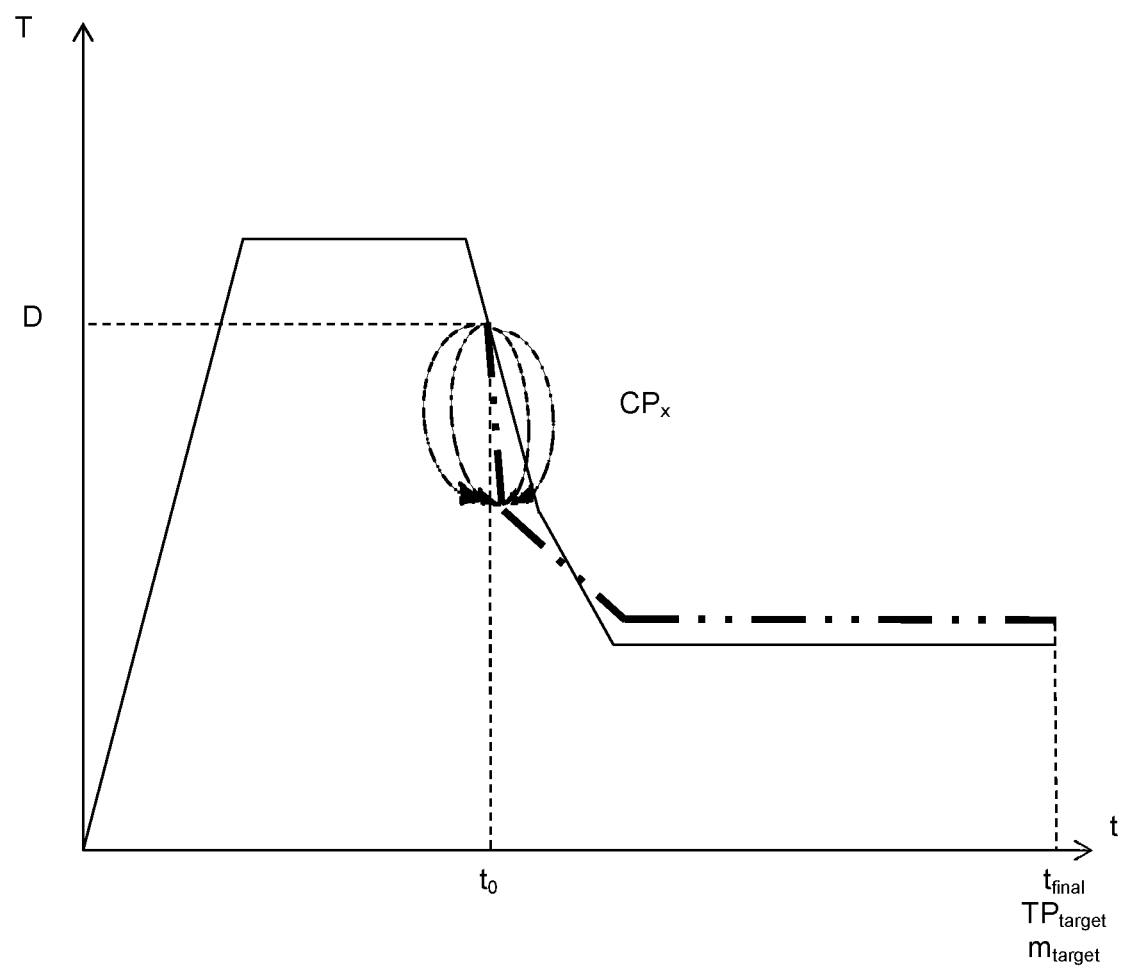
FIG. 2 illustrates a continuous annealing of a steel sheet comprising a heating step, a soaking step, a cooling step and an overaging step.

FIG. 2 illustrates a continuous annealing of a steel sheet comprising a heating step, a soaking step, a cooling step and an overaging step. A deviation D due to a variation of $T_{soaking}$ is detected. Thus, a multitude of $CP_x$ and therefore $TP_x$ are calculated such that $TP_{standard}$, being selected among $TP_x$, reach $m_{target}$ as shown only for the first cooling step in FIG. 2. In this example, the calculated $CP_x$ also includes the second cooling step (not shown).

In some embodiments, in step B.1), the cooling power of the cooling system varies from a minimum to a maximum value or from a maximum to a minimum value. For example, the cooling system comprises at least one jet cooling, at least one cooling spray or at least both. Preferably, the cooling system comprises at least one jet cooling, the jet cooling spraying a fluid being a gas, an aqueous liquid or a mixture thereof. For example, the gas is chosen from air, $HN_x$, $H_2$, $N_2$, Ar, He, steam water or a mixture thereof. For example, the aqueous liquid is chosen from: water or nanofluids.

In some embodiments, jets cooling spray gas with a flow rate between 0 and 350000 $Nm^3/h$. The number of jets cooling present in the cooling section depends on the heat treatment line, it can vary from 1 to 25, preferably from 1 to 20, advantageously from 1 to 15 and more preferably between from 1 and 5. The flow rate depends on the number of jets cooling. For example, the flow rate of one jet cooling is between 0 and 50000 $Nm^3/h$, preferably between 0 and 40000 $Nm^3/h$, more preferably between 0 and 20000 $Nm^3/h$.

When the cooling section comprises jets cooling, the variation of cooling power is based on the flow rate. For example, for one jet cooling, 0 $Nm^3/h$ corresponds to a cooling power of 0% and 40000 $Nm^3/h$ corresponds to a cooling power of 100%.

Thus, for example, the cooling power of one jet cooling varies from a 0 $Nm^3/h$, i.e. 0%, to 40000 $Nm^3/h$, i.e. 100%. The minimum and maximum value of the cooling power can be any value chosen in the range of 0 to 100%. For example, the minimum value is of 0%, 10%, 15% or 25%. For example, the maximum value is of 80%, 85%, 90% or 100%.

When the cooling section comprises at least 2 jets cooling, the cooling power can be the same or different on each jet cooling. It means that each jet cooling can be configured independently of one other. For example, when the cooling section comprising 11 jets cooling, the cooling power of the three first jets cooling can be of 100%, the cooling power of the following four can be of 45% and the cooling power of the last four can be of 0%.

For example, the variation of the cooling power has an increment between 5 to 50%, preferably between 5 to 40%, more preferably between 5 to 30% and advantageously between 5 to 20%. The cooling power increment is, for example, of 10%, 15% or 25%.

When the cooling section comprises at least 2 jets cooling, the cooling power increment can be the same or different on each jet cooling. For example, in step B.1), the cooling power increment can be of 5% on all the jets cooling. In another embodiment, the cooling power increment can be of 5% for the three first jets, 20% for the following four and 15% for the last four. Preferably, the cooling power increment is different for each jet cooling, for example 5% for the first jet, 20% for the second jet, 0% for the third jet, 10% for the fourth jet, 0% for the fifth jet, 35% of the sixth jet, etc.

In some embodiments, the cooling systems are configured depending on the phase transformation independently of one other. For example, when the cooling system comprises 11 jets cooling, the cooling power of the three first jets cooling can be configured for the transformation, the cooling power of the following four can be configured for the transformation of austenite into perlite and the cooling power of the last four can be configured for the transformation of austenite into bainite. In another embodiment, the cooling power increment can be different for each jet cooling.

In some embodiments, in step B.1), $T_{soaking}$ is a fixed number selected from the range between 600 to 1000° C. For example, $T_{soaking}$ can be of 700° C., 800° C. or 900° C. depending on the steel sheet.

In some embodiments, $T_{soaking}$ varies from 600 to 1000° C. For example, $T_{soaking}$ can vary from 650 to 750° C. or from 800 to 900° C. depending on the steel sheet.

In some embodiments, when $T_{soaking}$ varies, after step B.1), a further calculation sub step is performed wherein:
  a. $T_{soaking}$ varies from in a predefined range value being between 600 and 1000° C. and
  b. For each $T_{soaking}$ variation, new cooling paths $CP_x$ are calculated, based on TT, $m_i$ to reach $m_{standard}$ and $T_{cooling}$, the cooling step of TT being recalculated using said $CP_x$ in order to obtain new thermal paths $TP_x$, each $TP_x$ corresponding to a microstructure $m_x$.

Indeed, with the method according to the present invention, the variation of $T_{soaking}$ is taken into consideration for the calculation of $CP_x$. Thus, for each temperature of soaking, a multitude of new cooling paths $CP_x$ and therefore new $TP_x$ are calculated.

In some embodiments, at least 10 $CP_X$ are calculated, more preferably at least 50, advantageously at least 100 and more preferably at least 1000. For example, the number of calculated $CP_x$ is between 2 and 10000, preferably between 100 and 10000, more preferably between 1000 and 10000.

In some embodiments, in step B.2), one $TP_{target}$ to reach $m_{target}$ is selected, $TP_{target}$ being chosen from $TP_x$ and being selected such that $m_x$ is the closest to $m_{target}$. Preferably, the differences between phases proportions present in $m_{target}$ and $m_x$ is ±3%.

In some embodiments, in step B.2), when at least two $CP_x$ have their $m_x$ equal, the selected $TP_{target}$ selected is the one having the minimum cooling power needed.

In some embodiments, when $T_{soaking}$ varies, the selected $TP_{target}$ further includes the value of $T_{soaking}$ to reach $m_{target}$, $TP_{target}$ being chosen from $TP_x$.

In some embodiments, in step B.2), the thermal enthalpy $H_{released}$ between $m_i$ and $m_{target}$ is calculated such that:

$$H_{released} = (X_{ferrite} * H_{ferrite}) + (X_{martensite} * H_{martensite}) + (X_{bainite} * H_{bainite}) + (X_{pearlite} * H_{pearlite}) + (H_{cementite} + X_{cementite}) + (H_{austenite} + X_{austenite})$$

X being a phase fraction.

Without willing to be bound by any theory, H represents the energy released along the all thermal path when a phase transformation is performed. It is believed that some phase transformations are exothermic and some of them are endothermic. For example, the transformation of ferrite into austenite during a heating path is endothermic whereas the transformation of austenite into pearlite during a cooling path is exothermic.

In some embodiments, in step B.2), the all thermal cycle $CP_x$ is calculated such that:

$$T(t + \Delta t) = T(t) + \frac{(\varphi_{Convection} + \varphi_{radiance})}{\rho \cdot Ep \cdot C_{pe}} \Delta t \pm \frac{Hreleased}{C_{pe}}$$

with $C_{pe}$: the specific heat of the phase ($J \cdot kg^{-1} \cdot K^{-1}$), $\rho$: the density of the steel ($g \cdot m^{-3}$), Ep: the thickness of the steel (m), $\varphi$: the heat flux (convective and radiative in W), $H_{released}$ ($J \cdot kg^{-1}$), T: temperature (° C.) and t: time (s).

In some embodiments, in step B.2), at least one intermediate steel microstructure $m_{xint}$ corresponding to an intermediate thermal path $CP_{xint}$ and the thermal enthalpy $H_{xint}$ are calculated. In this case, the calculation of $CP_X$ is obtained by the calculation of a multitude of $CP_{xint}$. Thus, preferably, $CP_x$ is the sum of all $CP_{xint}$ and $H_{released}$ is the sum of all $H_{xint}$. In this preferred embodiment, $CP_{xint}$ is calculated periodically. For example, it is calculated every 0.5 seconds, preferably 0.1 seconds or less.

Figure 3:
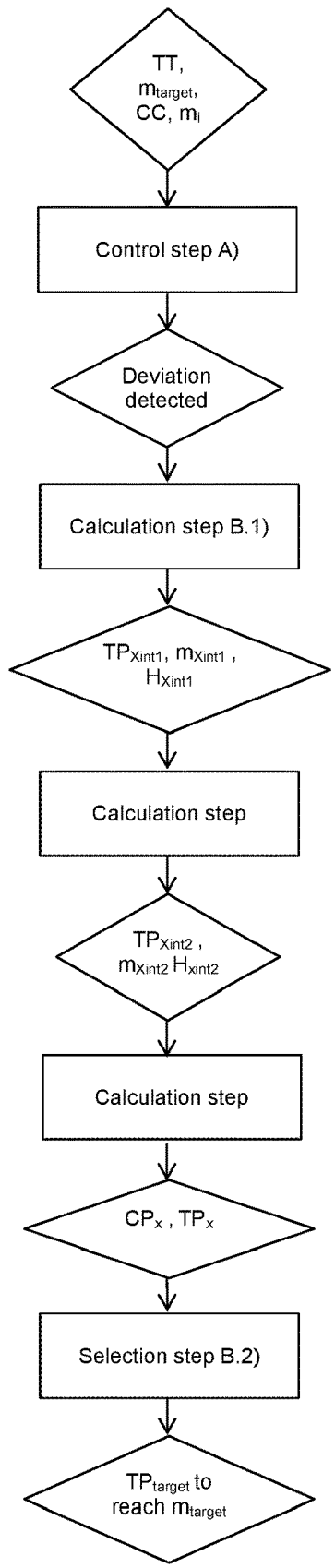
FIG. 3 illustrates a preferred embodiment according to the present invention.

FIG. 3 illustrates a preferred embodiment wherein in step B.1), $m_{int1}$ and $m_{int2}$ corresponding respectively to $CP_{xint1}$ and $CP_{xint2}$ as well as $H_{xint1}$ and $H_{xint2}$ are calculated. $H_{released}$ during the all thermal path is determined to calculate $CP_x$. In this embodiment, a multitude, i.e more than 2, of $CP_{xint}$, $m_{xint}$ and $H_{xint}$ are calculated to obtain $CP_x$ (not shown).

In some embodiments, before step A.1), at least one targeted mechanical property $P_{target}$ chosen among yield strength YS, Ultimate Tensile Strength UTS, elongation, hole expansion, formability is selected. In this embodiment, preferably, $m_{target}$ is calculated based on $P_{target}$.

Without willing to be bound by any theory, it is believed that the characteristics of the steel sheet are defined by the process parameters applied during the steel production. Thus, advantageously, in step B.1), the process parameters undergone by the steel sheet before entering the heat treatment line are taken into account to calculate $CP_x$. For example, the process parameters comprise at least one element chosen from among: a cold rolling reduction rate, a coiling temperature, a run out table cooling path, a cooling temperature and a coil cooling rate.

In another embodiment, the process parameters of the treatment line that the steel sheet will undergo in the heat treatment line are taken into account to calculate $CP_x$. For example, the process parameters comprise at least one element chosen from among: the line speed, a specific thermal steel sheet temperature to reach, heating power of the heating sections, a heating temperature and a soaking temperature, cooling power of the cooling sections, a cooling temperature and an overaging temperature.

In some embodiments, $T_{cooling}$ is the bath temperature when the cooling section is followed by a hot-dip coating section comprising a hot-dip bath. Preferably, the bath is based on aluminum or based on zinc. In a preferred embodiment, the bath based on aluminum comprises less than 15% Si, less than 5.0% Fe, optionally 0.1 to 8.0% Mg and optionally 0.1 to 30.0% Zn, the remainder being Al.

In some embodiments, the zinc-based bath comprises 0.01-8.0% Al, optionally 0.2-8.0% Mg, the remainder being Zn.

The molten bath can also comprise unavoidable impurities and residuals elements from feeding ingots or from the passage of the steel sheet in the molten bath. For example, the optionally impurities are chosen from Sr, Sb, Pb, Ti, Ca, Mn, Sn, La, Ce, Cr, Zr or Bi, the content by weight of each additional element being inferior to 0.3% by weight. The residual elements from feeding ingots or from the passage of the steel sheet in the molten bath can be iron with a content up to 5.0%, preferably 3.0%, by weight.

In some embodiments, $T_{cooling}$ is the quenching temperature Tq. Indeed, for the Q&P steel sheet, an important point of a quenching & partitioning treatment is $T_q$.

In some embodiments, $T_{cooling}$ is between 150 and 800° C.

In some embodiments, every time a new steel sheet enters into the heat treatment line, a new calculation step B.2) is automatically performed. Indeed, the method according to the present invention adapts the cooling path to each steel sheet even if the same steel grade enters in the heat treatment line since the real characteristics of each steel often differs. The new steel sheet can be detected and the new characteristics of the steel sheet are measured and are pre-selected beforehand. For example, a detector detects the welding between two coils.

In some embodiments, the adaptation of the thermal path is performed as the steel sheet entries into the heat treatment line on the first meters of the sheet in order to avoid strong process variation.

In some embodiments, an automatic calculation is performed during the thermal treatment to check if any deviation had appeared. In this embodiment, periodically, a calculation is realized to verify if a slight deviation had occurred. Indeed, the detection threshold of detector is sometimes too high which means that a slight deviation is not always detected. The automatic calculation, performed for example every few seconds, is not based on a detection threshold. Thus, if the calculation leads to the same thermal treatment, i.e. the thermal treatment performs online, TT will not change. If the calculation leads to a different treatment due to a slight deviation, the treatment will change.

Figure 4:
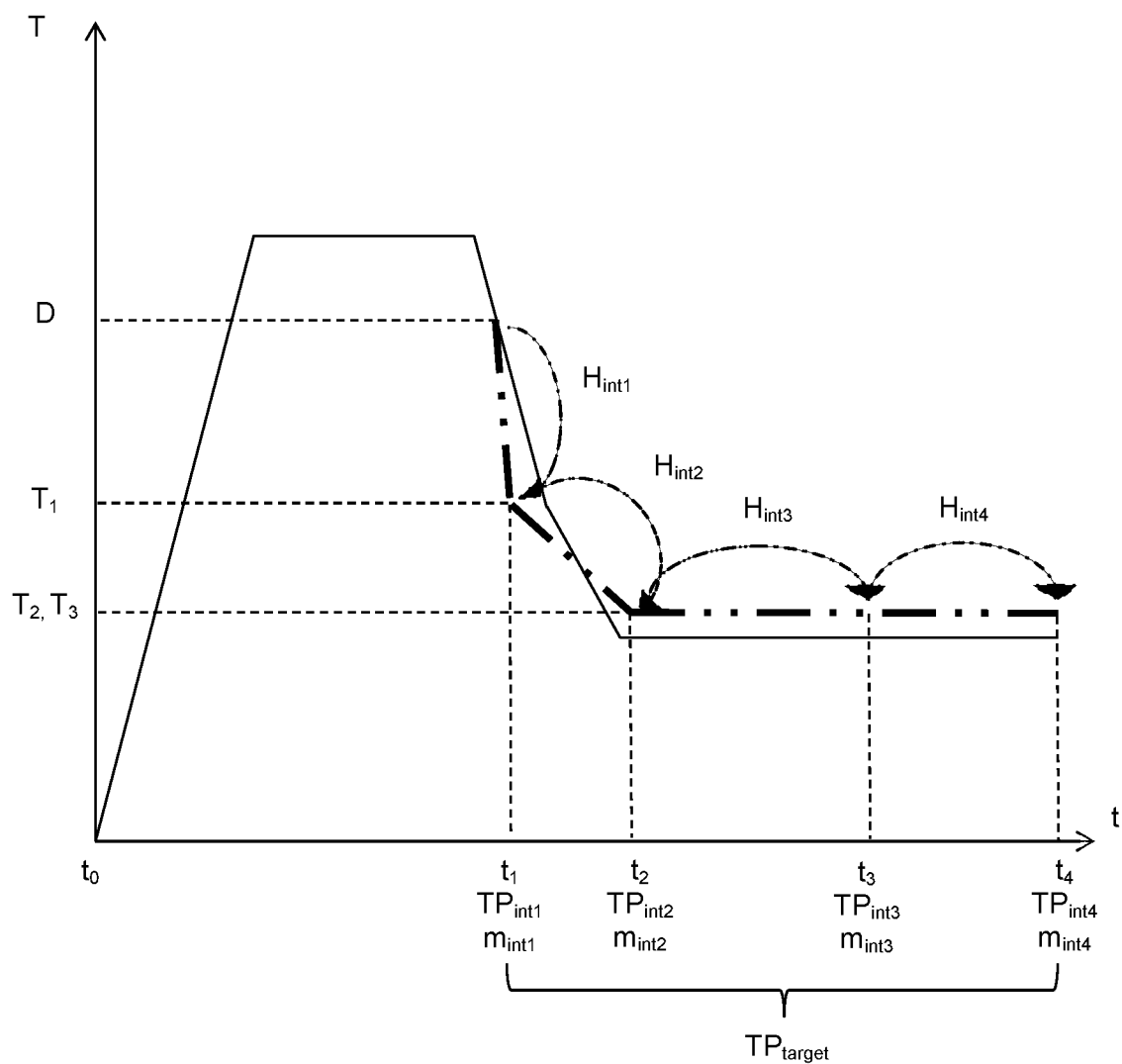
FIG. 4 illustrates one embodiment according to the present invention wherein a continuous annealing is performed on a steel sheet before the deposition of a coating by hot-dip.

FIG. 4 illustrates an embodiment according to the present invention, wherein a continuous annealing is performed on a steel sheet before the deposition of a coating by hot-dip. With the method according to an embodiment of the present invention, when a deviation D appears, $TP_x$ is calculated based on $m_i$, the selected product, TT and $m_{target}$. In this embodiment, intermediate thermal paths $CP_{xint1}$ to $CP_{xint4}$, corresponding respectively $m_{xint1}$ to $m_{xint4}$, and $H_{xint1}$ to $H_{xint4}$ are calculated. $H_{released}$ is determined in order to obtain $CP_x$ and therefore $TP_x$. In this Figure, $TP_{target}$ is illustrated.

With the method according to an embodiment of the present invention, when a deviation appears, a new a thermal treatment step $TP_{target}$ is performed on the steel sheet.

Thus, a coil made of a steel sheet including said predefined product types include, e.g., DP, TRIP, Q&P, TWIP, CFB, PHS, TRIPLEX, DUPLEX, DP HD is obtained, such coil having a standard variation of mechanical properties below or equal to 25 MPa, preferably below or equal to 15 MPa, more preferably below or equal to 9 MPa, between any two points along the coil. Indeed, without willing to be bound by any theory, it is believed that the method including the calculation step B.1) takes into account the microstructure dispersion of the steel sheet along the coil. Thus, $TP_{target}$ applied on the steel sheet allows for a homogenization of the microstructure and also of the mechanical properties.

In some embodiments, the mechanical properties are chosen from YS, UTS or elongation. The low value of standard variation is due to the precision of $TP_{target}$.

In some embodiments, the coil is covered by a metallic coating based on zinc or based on aluminum.

In some embodiments, in an industrial production, between two coils made of a steel sheet including said predefined product types include DP, TRIP, Q&P, TWIP, CFB, PHS, TRIPLEX, DUPLEX, DP HD, the standard variation of mechanical properties below or equal to 25 MPa, preferably below or equal to 15 MPa, more preferably below or equal to 9 MPa.

In some embodiments, in an industrial production, the standard variation of mechanical properties between 2 coils made of a steel sheet including said predefined product types include DP, TRIP, Q&P, TWIP, CFB, PHS, TRIPLEX, DUPLEX, DP HD measured successively produced on the same line is below or equal to 25 MPa, preferably below or equal to 15 MPa, more preferably below or equal to 9 MPa.

A thermally treatment line for the implementation of a method according to an embodiment of the present invention is used to perform $TP_{target}$. For example, the thermally treatment line is a continuous annealing furnace, a press hardening furnace, a batch annealing or a quenching line.

Finally, the present invention relates to a computer program product comprising at least a metallurgical module, an optimization module and a thermal module that cooperate together to determine $TP_{target}$ such modules comprising software instructions that when implemented by a computer implement a method according to the present invention.

The metallurgical module predicts the microstructure ($m_x$, $m_{target}$ including metastable phases: bainite and martensite and stables phases: ferrite, austenite, cementite and pearlite) and more precisely the proportion of phases all along the treatment and predicts the kinetic of phases transformation.

The thermal module predicts the steel sheet temperature depending on the installation used for the thermal treatment, the installation being for example a continuous annealing furnace, the geometric characteristics of the band, the process parameters including the power of cooling, heating or isotherm power, the thermal enthalpy H released or consumed along the all thermal path when a phase transformation is performed.

The optimization module determines the best thermal path to reach $m_{target}$, i.e. $TP_{target}$ following the method according to the present invention using the metallurgical and thermal modules. The invention will now be explained in trials carried out for information only. They are not limiting.

EXAMPLES

In the following examples, DP780GI having the following chemical composition was chosen:

| C (%) | Mn (%) | Si (%) | Cr (%) | Mo (%) | P (%) | Cu (%) | Ti (%) | N (%) |
|---|---|---|---|---|---|---|---|---|
| 0.145 | 1.8 | 0.2 | 0.2 | 0.0025 | 0.015 | 0.02 | 0.025 | 0.06 |

The cold-rolling had a reduction rate of 55% to obtain a thickness of 1.2 mm.

$m_{target}$ to reach comprises 12% of martensite, 58% of ferrite and 30% of bainite, corresponding to the following $P_{target}$: YS of 460 MPa and UTS of 790 MPa. A cooling temperature $T_{cooling}$ of 460° C. has also to be reached in order to perform a hot-dip coating with a zinc bath. This temperature must be reached with an accuracy of +/−2° C. to guarantee good coatability in the Zn bath.

The thermal treatment TT to perform on the steel sheet, is as follows:
- a pre-heating step wherein the steel sheet is heated from ambient temperature to 680° C. during 37.5 seconds,
- a heating step wherein the steel sheet is heated from 680° C. to 780° C. during 40 seconds,
- soaking step wherein the steel sheet is heated at a soaking temperature $T_{soaking}$ of 780° C. during 24.4 seconds,
- a cooling step wherein the steel sheet is cooled with 11 jets cooling spraying $HN_x$ as follows:

| Jets | Jet 1 | Jet 2 | Jet 3 | Jet 4 | Jet 5 | Jet 6 | Jet 7 | Jet 8 | Jet 9 | Jet 10 | Jet 11 |
|---|---|---|---|---|---|---|---|---|---|---|---|
| Cooling rate (° C./s) | 10 | 10 | 9 | 5 | 9 | 22 | 50 | 18 | 18 | 21 | 11 |
| Time (s) | 1.89 | 1.89 | 1.89 | 1.89 | 1.68 | 1.8 | 1.8 | 1.63 | 1.63 | 1.63 | 1.63 |
| T(° C.) | 754 | 734 | 718 | 708 | 693 | 653 | 563 | 533 | 504 | 481 | 463 |
| Cooling power(%) | 0 | 0 | 0 | 0 | 0 | 0 | 28 | 100 | 100 | 100 | 100 | a hot-dip coating in a zinc bath a 460° C.,
the cooling of the steel sheet until the top roll during 27.8 s at 300° C. and
the cooling of the steel sheet at ambient temperature.

Example 1: Deviation of $T_{Soaking}$

When the soaking temperature $T_{soaking}$ decreased from 780° C. to 765° C., a new thermal path $TP_{target1}$ is determined to reach $m_{target}$ taking the deviation into account. To this end, a multitude of thermal path $CP_x$ is calculated based on TT, $m_i$ of DP780GI to reach $m_{target}$, the heating path, the soaking path comprising $T_{soaking}$ and $T_{cooling}$.

The cooling step of TT was recalculated using said $CP_x$ in order to obtain new thermal paths $TP_x$. After the calculation of $TP_x$, one $TP_{target}$ to reach $m_{target}$ was selected, $TP_{target}$ being chosen from the recalculated $TP_x$ and being selected such that $m_x$ is the closest to $m_{target}$. $TP_{target1}$ is as follows:
- a soaking step wherein the steel sheet is heated at a soaking temperature $T_{soaking}$ of 765° C. during 24.4 seconds due to a deviation in the soaking section of the heat treatment line,
- a cooling step $CP_1$ including:
- a cooling step wherein the steel sheet is cooled with 11 jets cooling spraying $HN_x$ as follows:

| Jets | Jet 1 | Jet 2 | Jet 3 | Jet 4 | Jet 5 | Jet 6 | Jet 7 | Jet 8 | Jet 9 | Jet 10 | Jet 11 |
|---|---|---|---|---|---|---|---|---|---|---|---|
| Cooling rate (° C./s) | 9 | 9 | 10 | 15 | 32 | 28 | 31 | 11 | 10 | 7 | 8 |
| Time (s) | 1.89 | 1.89 | 1.89 | 1.89 | 1.68 | 1.8 | 1.8 | 1.63 | 1.63 | 1.63 | 1.63 |
| T(° C.) | 742 | 725 | 706 | 679 | 625 | 574 | 518 | 500 | 483 | 472 | 459 |
| Cooling power(%) | 0 | 0 | 0 | 25 | 50 | 50 | 45 | 45 | 45 | 45 | 45 | a hot-dip coating in a zinc bath à 460° C.,
the cooling of the steel sheet until the top roll during 27.8 s at 300° C. and
the cooling of the steel sheet at ambient temperature.

Example 2: Steel Sheet Having a Different Composition

A new steel sheet DP780 entered into the heat treatment line so a calculation step was automatically performed based on the following new CC:

| C(%) | Mn(%) | Si(%) | Cr(%) | Mo(%) | P(%) | Cu(%) | Ti(%) | N(%) |
|---|---|---|---|---|---|---|---|---|
| 0.153 | 1.830 | 0.225 | 0.190 | 0.0025 | 0.015 | 0.020 | 0.025 | 0.006 |

The new thermal path $TP_{target2}$ was determined to reach $m_{target}$ taking the new CC into account. $TP_{target2}$ is as follows:
- a pre-heating step wherein the steel sheet is heated from ambient temperature to 680° C. during 37.5 seconds,
- a heating step wherein the steel sheet is heated from 680° C. to 780° C. during 40 seconds,
- a soaking step wherein the steel sheet is heated at a soaking temperature $T_{soaking}$ of 780° C. during 24.4 seconds,
- a cooling step $CP_3$ including:

| Jets | Jet 1 | Jet 2 | Jet 3 | Jet 4 | Jet 5 | Jet 6 | Jet 7 | Jet 8 | Jet 9 | Jet 10 | Jet 11 |
|---|---|---|---|---|---|---|---|---|---|---|---|
| Cooling rate (° C./s) | 17 | 17 | 9 | 6 | 6 | 6 | 38 | 30 | 18 | 17 | 10 |
| Time (s) | 2.2 | 2.2 | 2.2 | 2.2 | 1.96 | 2.1 | 2.1 | 1.9 | 1.9 | 1.9 | 1.9 |
| T(° C.) | 737 | 705 | 688 | 677 | 667 | 655 | 586 | 537 | 508 | 481 | 464 |
| Cooling power(%) | 100 | 100 | 30 | 0 | 0 | 0 | 100 | 100 | 100 | 100 | 100 | a hot-dip coating in a zinc bath à 460° C.,
the cooling of the steel sheet until the top roll during 26.8 s at 300° C. and
the cooling of the steel sheet at ambient temperature.

Table 1 shows the steel properties obtained with TT, $TP_{target1}$ and $TP_{target2}$.

|  | TT | $TP_{target1}$ | $TP_{target2}$ | Expected properties |
|---|---|---|---|---|
| $T_{cooling}$ obtained (° C.) | 461 | 458 | 462 | 460 |
| Microstructure obtained at the end of the thermal path | $X_{martensite}$: 12% $X_{ferrite}$: 55% $X_{bainite}$: 33% | $X_{martensite}$: 12% $X_{ferrite}$: 61% $X_{bainite}$: 27% | $X_{martensite}$: 14% $X_{ferrite}$: 55% $X_{bainite}$: 32% | $X_{martensite}$: 12% $X_{ferrite}$: 58% $X_{bainite}$: 30% |
| Deviation (écart) with respect to $m_{target}$ | $X_{martensite}$: 0% $X_{ferrite}$: 3% $X_{bainite}$: 3% | $X_{martensite}$: 0% $X_{ferrite}$: 3% $X_{bainite}$: 3% | $X_{martensite}$: 2% $X_{ferrite}$: 3% $X_{bainite}$: 2% | — |
| YS (MPa) | 453.5 | 465 | 462 | 460 |
| YS deviation with respect to $P_{target}$ (MPa) | 6.5 | 5 | 2 | — |
| UTS (MPa) | 786.8 | 790 | 804 | 790 |
| UTS deviation with respect to $P_{target}$ (MPa) | 3.2 | 0 | 14 | — |

With the method according to the present invention, it is possible to adjust a thermal TT when a deviation appears or when a new steel sheet having a different CC enters into the heat treatment line. By applying the new thermal paths $TP_{target1}$ and $TP_{target2}$, it is possible to obtain a steel sheet having the desired expected properties, each $TP_{target}$ being precisely adapted depending on each deviation.

What is claimed is:

1. A method of dynamical adjustment for manufacturing a thermally treated steel sheet having a chemical steel composition and a microstructure $m_{target}$ comprising at least one phase chosen among: ferrite, martensite, bainite, pearlite, cementite and austenite, in a heat treatment line comprising a heating section, a soaking section and a cooling section including a cooling system, wherein a predefined thermal treatment TT, comprising at least a heating step, a soaking step and a cooling step, is performed, such method comprising:
    performing the heating step of the predefined thermal treatment on a steel sheet in the heating section of the heat treatment line in accordance with a heating path $T_{heating}$, the heating path $T_{heating}$ including a time, temperature and a heating rate;
    performing the soaking step of the predefined thermal treatment on the steel sheet in the soaking section of the heat treatment line in accordance with a heating path $T_{soaking}$, the heating path $T_{soaking}$ including a time, temperature and a soaking rate;
    A. a control step wherein at least one detector detects any deviation happening during the heating step in the heating section of the heat treatment line or during the soaking step in the soaking section of the heat treatment line, the deviation being such that the predefined thermal treatment TT is determined to produce a microstructure different from $m_{target}$,
    B. a calculation step performed when a deviation is detected during the heating step in the heating section of the heat treatment line or during the soaking step in the soaking section of the heat treatment line such that a new thermal path $TP_{target}$, performed as at least one further heat treatment step in the heat treatment line sequentially downstream from the performed at least one thermal treatment step, is determined to reach $m_{target}$ taking the deviation into account, such calculation step comprising:
        1) a calculation sub-step wherein through variation of a cooling power of the cooling system of the cooling section of the heat treatment line in the cooling step, new cooling paths $CP_x$ are calculated based on TT, an initial microstructure $m_i$ of the steel sheet to reach $m_{target}$, the heating path $T_{heating}$ and the soaking path $T_{soaking}$ the cooling step of TT being recalculated using said new cooling paths $CP_x$ in order to obtain new thermal paths $TP_x$, having the cooling step replaced by one of the new cooling paths $CP_x$ in order to obtain a thermal path $TP_x$, each $TP_x$ corresponding to a microstructure $m_x$,
        2) a selection step wherein one thermal path $TP_{target}$, from amongst the thermal paths $TP_x$ calculated in the calculation substep, achieving the $m_x$ closest to $m_{target}$ is selected the selected thermal path $TP_{target}$ including a selected one of the new cooling paths $CP_x$, and
    C. performing a new thermal treatment step including the selected thermal path $TP_{target}$ online on the steel sheet, the performing of the new thermal treatment step including performing the selected new cooling path $CP_x$ on the steel sheet by the cooling system of the cooling section of the heat treatment line in place of the cooling step of the predefined thermal treatment.

2. The method according to claim 1, wherein in step A), the deviation is due to a variation of one process parameter chosen from among: a furnace temperature, a temperature of the steel sheet, an amount of gas, a gas composition, a gas temperature, a line speed, a failure of equipment in the heat treatment line, a variation of a parameter of a hot-dip bath of the heat treatment line, an emissivity of the steel sheet and a variation of a thickness of the steel sheet.

3. The method according to claim 1, wherein the at least one phase is defined by at least one element chosen from: a size, a shape and a chemical composition.

4. The method according to claim 1, wherein the microstructure $m_{target}$ is selected from a group consisting of:
    100% of austenite,
    from 5 to 95% of martensite, from 4 to 65% of bainite, the balance being ferrite,
    from 8 to 30% of residual austenite, from 0.6 to 1.5% of carbon in solid solution, the balance being ferrite, martensite, bainite, pearlite and/or cementite,
    from 1% to 30% of ferrite, from 1% to 30% of bainite, from 5 to 25% of austenite, the balance being martensite,
    from 5 to 20% of residual austenite, the balance being martensite,
    ferrite and residual austenite,
    residual austenite and intermetallic phases,
    from 80 to 100% of martensite and from 0 to 20% of residual austenite,
    100% martensite,
    from 5 to 100% of pearlite and from 0 to 95% of ferrite, or
    at least 75% of equiaxed ferrite, from 5 to 20% of martensite and bainite in amount less than or equal to 10%.

5. The method according to claim 1, wherein the steel sheet is selected from a group consisting of Dual Phase steel, Transformation Induced Plasticity steel, Quenched & Partitioned steel, Twins Induced Plasticity steel, Carbide Free Bainite steel, Press Hardening steel, TRIPLEX steel, or DUPLEX steel.

6. The method according to claim 1, wherein TT further comprises a pre-heating step.

7. The method according to claim 1, wherein TT further comprises a hot-dip coating step, an overaging step or a partitioning step.

8. The method according to claim 1, wherein in step B.1), the cooling power of the cooling system varies from a minimum to a maximum value.

9. The method according to claim 1, wherein in step B.1), the cooling power of the cooling system varies from a maximum to a minimum value.

10. The method according to claim 1, wherein in step B.1), $T_{soaking}$ is a fixed number selected from a range between 600 to 1000° C.

11. The method according to claim 1, wherein in step B.1), $T_{soaking}$ varies from 600 to 1000° C.

12. The method according to claim 11, wherein after step B.1), a further calculation sub-step is performed wherein:
  a. $T_{soaking}$ varies from in a predefined range value of between 600 and 1000° C. and
  b. For each $T_{soaking}$ variation, new cooling paths $CP_x$ are calculated, based on TT, $m_i$ to reach $m_{standard}$ and $T_{cooling}$, the cooling step of TT being recalculated using said $CP_x$ in order to obtain new thermal paths $TP_x$, each $TP_x$ corresponding to a microstructure $m_x$.

13. The method according to claim 12, wherein in the selection step B.2), the selected $TP_{target}$ further includes the value of $T_{soaking}$.

14. The method according to claim 1, wherein in step B.2), when at least two $CP_x$ have their $m_x$ equal, the selected $TP_{target}$ selected is the one having the minimum cooling power needed.

15. The method according to claim 1, when in step B.1), differences between phases proportions present in $m_{target}$ and phases proportions of phase present in $m_x$ achieved by the thermal path selected in substep B.2) is ±3%.

16. The method according to claim 1, wherein in step B.1), the thermal enthalpy H released between $m_i$ and $m_{target}$ is calculated such that:

$$H_{released} = (X_{ferrite} * H_{ferrite})(X_{martensite} * H_{martensite}) \\ (X_{bainite} * H_{bainite})(X_{pearlite} * H_{pearlite}) \\ (H_{cementite} * X_{cementite})(H_{austenite} * X_{austenite}),$$

X being a phase fraction.

17. The method according to claim 13, wherein in step B.1), the cooling paths $CP_x$ are calculated such that:

$$T(t + \Delta t) = T(t) + \frac{(\varphi_{Convection} + \varphi_{radiance})}{\rho \cdot Ep \cdot C_{pe}} \Delta t \pm \frac{H_{released}}{C_{pe}}$$

with Cpe: the specific heat of the phase (J·kg$^{-1}$·K$^{-1}$), ρ: the density of the steel (g·m$^{-3}$), Ep: thickness of the steel (m), φ: the heat flux (convective and radiative in W), $H_{released}$ (J·kg$^{-1}$), T: temperature (° C.) and t: time (s).

18. The method according to claim 16, wherein in step B.1), at least one intermediate steel microstructure mxint corresponding to an intermediate cooling path $CP_{xint}$ and the thermal enthalpy $H_{xint}$ are calculated.

19. The method according to claim 18, wherein in step B.1), $CP_x$ is the sum of all $CP_{xint}$ and $H_{released}$ is the sum of all $H_{xint}$.

20. The method according to claim 1, wherein before step A), at least one targeted mechanical property $P_{target}$ chosen among yield strength YS, Ultimate Tensile Strength UTS, elongation hole expansion, formability is selected.

21. The method according to claim 20, wherein $m_{target}$ is calculated based on $P_{target}$.

22. The method according to claim 1, wherein in step B.1), the process parameters undergone by the steel sheet before entering the heat treatment line are taken into account to calculate $CP_x$.

23. The method according to claim 22, wherein the process parameters comprise at least one element chosen from among: a cold rolling reduction rate, a coiling temperature, a run out table cooling path, a cooling temperature and a coil cooling rate.

24. The method according to claim 1, wherein in step B.1) the process parameters of the treatment line that the steel sheet will undergo in the heat treatment line are taken into account to calculate $CP_x$.

25. The method according to claim 24, wherein the process parameters comprise at least one element chosen from among: a specific thermal steel sheet temperature to reach, the line speed, cooling power of the cooling section, heating power of the heating section, an overaging temperature, a cooling temperature, a heating temperature and a soaking temperature.

26. The method according to claim 1, wherein the cooling system comprises at least one jet cooling, at least one cooling spray or at least both.

27. The method according to claim 26, wherein when the cooling system comprises at least one jet cooling, the jet cooling spraying a gas, an aqueous liquid or a mixture thereof.

28. The method according to claim 27, wherein the gas is chosen from air, $HN_x$, $H_2$, $N_2$, Ar, He, steam water or a mixture thereof.

29. The method according to claim 28, wherein the aqueous liquid is chosen from water or nanofluid.

30. The method according to claim 28, wherein the jet cooling sprays air with a debit flow between 0 and 350000 Nm$^3$/h.

31. The method according to claim 1, wherein $T_{cooling}$ is the bath temperature when the cooling section is followed by a hot-dip coating section comprising a hot-dip bath.

32. The method according to claim 31, wherein the bath is based on aluminum or a bath based on zinc.

33. The method according to claim 1, wherein $T_{cooling}$ is the quenching temperature $T_q$.

34. The method according to claim 1, wherein $T_{cooling}$ is between 150 and 800° C.

35. The method according to claim 1, wherein every time a new steel sheet enters into the heat treatment line, step B.1) is automatically performed.

36. The method according to claim 1, wherein the selected new cooling path $CP_x$ on the steel sheet is performed as the steel sheet entries into the cooling section of the heat treatment line on the first meters of the sheet.

37. The method according to claim 1, wherein an automatic calculation is performed during the thermal treatment to check if any deviation had appeared.

* * * * *